United States Patent [19]

Yamaguchi et al.

[11] Patent Number: 5,135,677
[45] Date of Patent: Aug. 4, 1992

[54] PROCESS FOR PRODUCING ACID-TYPE MALEIC ACID POLYMER AND WATER-TREATING AGENT AND DETERGENT ADDITIVE CONTAINING SAID POLYMER

[75] Inventors: Shigeru Yamaguchi; Shorbu Shioji; Yoshio Irie, all of Himeji; Teruaki Fujiwara, Nagaokakyo, all of Japan

[73] Assignee: Nippon Shokubai Co., Ltd., Osaka, Japan

[21] Appl. No.: 629,037

[22] Filed: Dec. 19, 1990

Related U.S. Application Data

[63] Continuation of Ser. No. 335,938, Apr. 10, 1989, abandoned.

[30] Foreign Application Priority Data

Apr. 11, 1988 [JP] Japan .................................. 63-87218
Oct. 25, 1988 [JP] Japan ................................ 63-267181

[51] Int. Cl.$^5$ ...................... C02F 5/10; C08F 222/06; C08F 122/06
[52] U.S. Cl. ...................................... 252/180; 252/82; 252/174.24; 526/317.1; 526/318.2; 526/271; 526/272
[58] Field of Search ...................... 252/82, 174.24, 180; 526/317.1, 318.2, 271, 272

[56] References Cited

U.S. PATENT DOCUMENTS

| | | | |
|---|---|---|---|
| 3,635,915 | 1/1972 | Gale | 526/318.2 |
| 3,846,383 | 11/1974 | Uyama et al. | 526/216 |
| 4,314,044 | 2/1982 | Hughes | 526/317.1 |
| 4,589,995 | 5/1989 | Fukumoto | 252/180 |
| 4,659,793 | 4/1987 | Yang | 526/91 |
| 4,818,795 | 4/1989 | Denzinger et al. | 526/272 |

FOREIGN PATENT DOCUMENTS 2181735 10/1986 United Kingdom .

Primary Examiner—Paul Lieberman
Assistant Examiner—Bradley A. Swope
Attorney, Agent, or Firm—Oblon, Spivak, McClelland, Maier & Neustadt

[57] ABSTRACT

The present invention relates to a process for producing an acid-type polymaleic acid and acid-type maleic acid copolymer and also to the usage of the acid-type polymaleic acid and acid-type maleic acid copolymer produced by this process.

According to the process of the present invention, the acid-type polymaleic acid and acid-type maleic acid copolymer, which are superior as a water-treating agent and detergent additive, are produced by polymerization of acid-type monomers in an aqueous solution. The process is simple and yields a polymer having a low molecular weight and a narrow molecular-weight distribution. The process permits one to economically produce the acid-type polymaleic acid and acid-type maleic acid copolymer which has good quality and outstanding performance as a water-treating agent etc. Thus the invention is a great boon to the industrial field of water treatment.

13 Claims, 1 Drawing Sheet

PROCESS FOR PRODUCING ACID-TYPE MALEIC ACID POLYMER AND WATER-TREATING AGENT AND DETERGENT ADDITIVE CONTAINING SAID POLYMER

This application is a continuation of application Ser. No. 335,938, filed on Apr. 10, 1989 now abandoned.

BACKGROUND OF THE INVENTION

1. Field of the Invention

The present invention relates to a process for producing an acid-type polymaleic acid and acid-type maleic acid copolymer having acrylic acid structural units in the molecule and also to their usage as a water treating agent, detergent builder, and chelating agent. More particularly, the present invention is concerned with a process for producing efficiently and economically acid-type polymaleic acid or acid-type maleic acid copolymer of high quality using water as the solvent and a specific polymerization catalyst, and also with a water treating agent and detergent additive containing the thus produced polymer. According to the process of the present invention, it is possible to produce acid-type polymaleic acid and acid-type maleic acid copolymer of high quality having a narrow molecular-weight distribution and a low molecular weight.

2. Description of the Prior Art

Maleic acid (co)polymers have been in general use as a water treating agent, detergent additive, dispersing agent, and chelating agent. There are many processes for their production as disclosed in, for example, Japanese Patent Laid-open Nos. 168906/1982 (U.S. Pat. Nos. 4519920, 4555557), 64613/1984, 64615/1984 (U.S. Pat. No. 4668735), 176312/1984(U.S. Pat. No. 4589995), 210913/1984 (U.S. Pat. No. 4668735), 213714/1984, 212410/1985, 178097/1986, 218407/1987 (U.S. Pat. No. 4659793), 114986/1988, 235313/1988, and 236600/1988, and Japanese Patent Publication No. 54005/1981.

Unfortunately, these processes yield maleic acid (co)polymers which are unsatisfactory in performance because they have such a high molecular weight and/or a broad molecular-weight distribution that they are liable to gelation through chelation with cations (such as Ca ions) in water. Therefore, there has been a demand for maleic acid (co)polymers having a low molecular weight and a narrow molecular-weight distribution.

In addition, the production processes disclosed so far yield maleic acid (co)polymers in the form of salt such as ammonium salt, sodium salt, and potassium salt. A disadvantage of such products is poor miscibility with nonionic surface active agents in the case where they are used as a detergent additive such as detergent builder. Thus they make it difficult to produce stable liquid detergent compositions and their use is greatly limited. Another disadvantage of salt-type maleic acid (co)polymers is that they cannot be made into a one-pack type water treating agent which is composed of a maleic acid (co)polymer and zinc, because they are less miscible with zinc than acid-type maleic acid polymers.

There are disclosed processes for producing maleic acid (co)polymers having a narrow molecular-weight distribution in Japanese Patent Laid-open Nos. 212411/1985 (U.S. Pat. No. 4709091) and 212412/1985. A disadvantage of these processes is that they involve polymerization which is performed in two stages according to the degrees of neutralization, which leads to a long polymerization time and complex operation. Another disadvantage arises from using a persulfate as the catalyst which would corrode the reaction vessel made of SUS-304 or the like. Moreover, these processes yield only salt-type maleic acid (co)polymers, which are poor in performance as a detergent additive and water treating agent, as mentioned above.

In contrast with salt-type maleic acid (co)polymers, acid type maleic acid (co)polymers are free of the above-mentioned disadvantages and exhibit outstanding characteristic properties when used as a water treating agent and detergent additive. The acid-type maleic acid (co)polymers can be produced by eliminating alkali metal ions from the salt-type maleic acid (co)polymers. This process, however, is not desirable because it needs complex operations and leads to a high production cost. And yet it does not eliminate the serious drawback of yielding polymers having a high molecular weight and a broad molecular-weight distribution.

On the other hand, there are disclosed processes for producing acid-type maleic acid (co)polymers in Japanese Patent Laid-open No. 19089/1976 and Japanese Patent Publication Nos. 57482/1982 (U.S. Pat. No. 3919258) and 36042/1987 (U.S. Pat. No. 4212788). These processes include the steps of polymerizing maleic acid anhydride alone or in combination with other polymerizable monomers in an organic solvent (such as toluene and xylene) in the presence of an oil-soluble polymerization initiator (such as benzoyl peroxide, azobisisobutyronitrile, and di-t-butyl peroxide), distilling out the solvent, and hydrolyzing the resulting polymer to give an acid-type maleic acid (co)polymer. These processes, however, are not advantageous from the standpoint of increased steps, potential dangers, high production cost, and waste of material, which arise from the polymerization performed in an organic solvent.

The above-mentioned processes have another disadvantage that they yield maleic acid (co)polymers which, when used as an antiscale agent, are liable to combine with alkaline earth metal ions (such as Ca ions and Mg ions) in water being treated, forming insoluble salts and resulting in insufficient scale prevention. This is because the maleic acid (co)polymer has extremely hydrophobic groups such as aromatic hydrocarbon residues (originating from the polymerization solvent) and t-butyl groups (originating from the polymerization initiator).

There is disclosed in Japanese Patent Laid-open Nos. 91295/1987 and 91296/1987 (GB 2181735) a process for producing a salt-type maleic acid (co)polymer as an antiscale agent by using a mixture of water and alcohol and/or ketone containing $FeSO_4$ as the polymerization solvent and hydrogen peroxide as the polymerization catalyst. This process, however, has some shortcomings. That is, it does not perform (co)polymerization quite well. In the case of copolymerization with acrylic acid, it does not introduce acrylic acid units evenly into the main chain of the resulting polymer, and hence the resulting copolymer has a broad molecular-weight distribution and is liable to decarbonization when used at high temperatures. In addition, the process leaves much monomer unpolymerized. If the polymerization solvent contains a high-boiling solvent (such as methyl ethyl ketone), it remains in the resulting polymer, posing a problem of odor and safety. Moreover, the polymer produced by this process is not satisfactory when used as a water treating agent and detergent additive.

There have been proposed several processes for producing maleic acid copolymers and usages of maleic acid copolymers in Japanese Patent Laid-open Nos. 126810/1982, 122906/1983, 147412/1983, and 68806/1987. The processes proposed in the first two patent applications yield maleic acid copolymers having a broad molecular-weight distribution, containing a large amount of residual monomer, and lacking biodegradability. The processes proposed in the last two patent applications yield maleic acid copolymers which are poor in biodegradability.

There is a description in U.S. Pat. No. 4314044 and U.S. Pat. No. 3635915 about the fact that a redox polymerization catalyst composed of a polyvalent metal ion such as $Fe^{2+}$ (as a reducing agent) and a peroxide is effective in the copolymerization of an unsaturated dicarboxylic acid (such as maleic acid) and an unsaturated monocarboxylic acid (such as acrylic acid). A disadvantage of this redox polymerization is that the polyvalent metal ion (especially $Fe^{2+}$) should be used in an amount of 1/150 to 1/10 mol per mol of the peroxide to bring about the oxidation-reduction reaction between the peroxide (as the initiator) and the polyvalent metal ion (as the reducing agent), and the polyvalent metal ion contaminates or discolors the product. In addition, the redox polymerization yields only a maleic acid copolymer having a broad molecular-weight distribution which is not suitable for use as a water treating agent and detergent additive There is disclosed in Japanese Patent Laid-open No. 218407/1987 (U.S. Pat. No. 4659793) a process for producing an aqueous solution of a dicarboxylic acid copolymer, said process comprising reacting an ethylenic unsaturated dicarboxylic acid which is at least partially neutralized and an $\alpha,\beta$-ethylenic unsaturated monomer in the presence of a water-soluble polymerization initiator and a polyvalent metal ion, while keeping the aqueous solution system at pH 2-7. This process yields a salt-type maleic acid copolymer such as the one mentioned above. The copolymer has an advantage of containing only a small amount of unreacted monomer but also has a disadvantage of being poor in miscibility with a nonionic surface active agent and Zn. Moreover, the copolymer cannot be made into an acid-type maleic acid copolymer by the removal of alkali metal without increase in manufacturing steps and production cost.

There are other processes for producing the polymer by performing the polymerization by the aid of a polymerization initiator and a polyvalent metal ion, as disclosed in Japanese Patent Laid-open Nos. 62804/1987 (U.S. Pat. No. 4786699) and 267307/1987 (EP 242791). These processes are concerned with the production of polyvinyl pyrrolidone and polyarylamine.

SUMMARY OF THE INVENTION

The present invention was completed to overcome the above-mentioned disadvantages involved in the prior art technology. Accordingly, it is an object of the present invention to provide a process for producing in a simple, economical manner an acid-type polymaleic acid and acid-type maleic acid copolymer useful as a water-treating agent and detergent additive, especially an acid-type polymaleic acid and acid-type maleic acid copolymer having a low molecular weight and a narrow molecular-weight distribution. It is another object of the present invention to provide an inexpensive, high-performance water-treating agent and detergent additive which are based on the acid-type polymaleic acid and acid-type maleic acid copolymer produced by the above-mentioned process. In the description in this specification, the acid-type polymaleic acid and acid-type maleic acid copolymer may be collectively referred to as acid-type maleic acid polymer.

The gist of the present invention resides in a process for producing an acid-type maleic acid polymer having a number-average molecular weight of 300–5000 and a D-value smaller than 2.5 (defined below), said process comprising polymerizing in an aqueous solution a monomer component composed of maleic acid (A) alone or a monomer component composed of 50–99.9 wt % of maleic acid (A) and 50–0.1 wt % of other water-soluble unsaturated monomer (B), in the presence of at least one metal ion selected from the group consisting of iron ion, vanadium atom-containing ion, and copper ion in an amount of 0.5–500 ppm of said monomer component, by the aid of hydrogen peroxide as the polymerization catalyst in an amount of 8–100 g per mol of said monomer.

D value = $M_W/M_N$ $M_W$ = weight-average molecular weight $M_N$ = number-average molecular weight The gist of the present invention also resides in a water-treating agent or detergent additive which contains the acid-type maleic acid polymer obtained by the above-mentioned process.

According to the process of the present invention, an acid type polymaleic acid (homopolymer) is obtained from the monomer component composed of maleic acid (A) alone and an acid-type maleic acid copolymer is obtained from the monomer component composed of maleic acid (A) and other water-soluble unsaturated monomer (B). In either cases, it is necessary that water should be used alone as the polymerization medium. If the polymerization medium is a hydrophilic solvent such as alcohol and ketone or a mixture of water and a hydrophilic solvent, it is impossible to produce the acid-type polymaleic acid (homopolymer) having the acrylic acid structure in the main chain, or it is impossible to produce the acid-type maleic acid copolymer in which maleic acid (A) and water-soluble monomer (B) are evenly copolymerized. In addition, the resulting polymer or copolymer contains a large amount of unreacted monomers.

According to the process of the present invention, water is used alone as the polymerization medium and polymerization is performed under specific conditions, so that the polymerization of acid-type monomer proceeds efficiently and the resulting polymer contains terminal groups different from those of conventional maleic acid (co)polymers. The maleic acid polymer in the present invention is suitable for use as a water-treating agent and detergent additive because it has a low molecular weight and a narrow-molecular weight distribution.

By the way, the process of the present invention differs from the conventional process in that acid-type maleic acid is polymerized, without being changed previously into salt-type maleic acid, under specific polymerization conditions. In many of the conventional processes, salt-type maleic acid is used as the starting material because acid-type maleic acid does not readily polymerize in an aqueous medium, which prevents the efficient production of monomers Moreover, the process of the present invention provides polymers having a narrow molecular-weight distribution and highly reactive terminal groups, which make the polymers suitable for use as a water-treating agent and detergent additive. The process of the present invention is simple because it yields the acid-type maleic acid polymer directly. Also, the process of the present invention yields high-quality polymers which cause contamination very little because it uses only a small amount of metal ions.

According to the process of the present invention, the copolymer is produced from maleic acid (A) and other water-soluble unsaturated monomer (B) as the copolymer component. Examples of the water-soluble unsaturated monomer (B) include the following. Unsaturated monocarboxylic acids such as acrylic acid, methacrylic acid, α-hydroxyacrylic acid, and crotonic acid; unsaturated polycarboxylic acids such as fumaric acid, itaconic acid, citraconic acid, and aconitic acid; vinyl acetate; unsaturated hydroxyl group-containing compounds such as 3-methyl-3-buten-1-ol (isoprenol), 3-methyl-2-buten-1-ol (prenol), and 2-methyl-3-buten-2-ol (isoprene alcohol), and their adducts with 1-100 mol of ethylene oxide and/or propylene oxide, which are represented by the general formula (1) below;

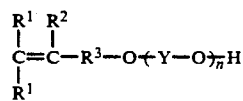

(1)

(where $R^1$ and $R^2$ independently denote hydrogen or a methyl group (but do not denote a methyl group simultaneously); $R^3$ denotes $-CH_2-$, $-(CH_2)_2-$, or $-C(CH_3)_2-$; $R^1$, $R^2$, and $R^3$ contain 3 carbon atoms in total; Y denotes an alkylene group having 2-3 carbon atoms; and n is 0 or an integer 1-100); unsaturated (meth)allyl ethers such as 3-allyloxy-2-hydroxypropanesulfonic acid, and glycerol monoallyl ether, and their adducts with 1-100 mol of ethylene oxide and/or propylene oxide, which are represented by the formula (2) below;

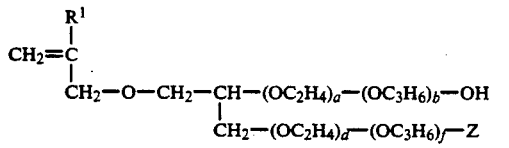

(2)

(where $R^1$ denotes hydrogen or a methyl group; a, b, d, and f denote independently 0 or an integer of 1-100 and a+b+d+f=0-100; the $-OC_2H-$ units and the $-OC_3H-$ units may be connected in any order; and Z denotes a hydroxyl group, sulfonic group, or phosphoric (or phosphorous) group if the sum of d and f is 0, or a hydroxyl group if the sum of d and f is a positive integer of 1-100); unsaturated sulfonic group-containing compounds such as vinylsulfonic acid, allylsulfonic acid, methallylsulfonic acid, styrenesulfonic acid, 2-acrylamide-2-methylpropanesulfonic acid, sulfoethyl (meth)acrylate, sulfopropyl (meth)acrylate, 2-hydroxysulfopropyl (meth)acrylate, and sulfoethylmaleimide; monoesters or diesters composed of an adduct of $C_{1-20}$ alkyl alcohol with 0-100 mol of ethylene oxide and/or propylene oxide and an unsaturated carboxylic acid such as (meth)acrylic acid, crotonic acid, maleic acid, fumaric acid, itaconic acid, citraconic acid, aconitic acid; and monoesters or diesters composed of an unsaturated carboxylic acid such as (meth)acrylic acid, crotonic acid, maleic acid, fumaric acid, itaconic acid, citraconic acid, and aconitic acid, and 1-100 mol of ethylene oxide and/or propylene oxide.

These monomers may be used alone or in combination with one another. Maleic acid is readily produced by reacting maleic anhydride and water, so in present invention, it is obvious that maleic anhydride may be used instead of maleic acid.

In the case where the acid-type maleic acid copolymer of the present invention is intended for use as a water-treating agent or detergent additive, the adequate water-soluble monomer (B) is selected from the unsaturated monocarboxylic acids (particularly acrylic acid and methacrylic acid), the unsaturated alcohols (particularly isoprenol and polyethylene glycol monoisoprenol ether) represented by the general formula (1) above, and unsaturated allyl ethers (particularly glycerol monoallyl ether and 3-allyloxy-2-hydroxypropanesulfonic acid) represented by the general formula (2) above.

According to the process of the present invention, the maleic acid (A) and the water-soluble monomer (B) should be used in a ratio of 50-99.9 wt % (preferably 75-99.9 wt %) for the former and 50-0.1 wt % (preferably 25-0.1 wt %) for the latter. If the water-soluble monomer (B) is used in an amount more than 50 wt %, the resulting polymer contains an undesirably large amount of residual monomer which makes the polymer unsuitable for use as a detergent additive and also makes the polymer poor in biodegradability.

The process of the present invention employs metal ions. Examples of the metal ions include iron ion, vanadium atom-containing ion, and copper ion. Preferable among them are $Fe^{3+}$, $Fe^{2+}$, $Cu^+$, $CU^{2+}$, $V^{2+}$, $V^{3+}$, $VO^{2+}$, and $VO_3^-$. Particularly desirable metal ions include $Fe^{3+}$, $CU^{2+}$, and $VO^{2+}$. They may be used alone or in combination with one another.

According to the process of the present invention, the metal ion should be used in an amount of 0.5-500 ppm, preferably 5-100 ppm, of the monomer component. With an amount less than the lower limit, the metal ion does not increase the rate of polymerization or copolymerization When the metal ion is used in an amount more than the upper limit, the acid-type maleic acid polymer becomes discolored and have such a broad molecular-weight distribution that it is unsuitable for use as a water-treating agent and detergent additive and is poor in biodegradability.

The metal ion can be used in any form so long as it become ionized in the polymerization system. Examples of the metal compounds that can be used include water-soluble metal salts such as vanadium oxychloride, vanadium trichloride, vanadyl oxalate, vanadyl sulfate, vanadic anhydride, ammonium metavanadate, ammonium hypovanadous sulfate [$(NH_4)_2SO_4 \cdot VSO_4 \cdot 6H_2O$], ammonium vanadous sulfate [$(NH_4)V(SO_4)_2 \cdot 12H_2O$], copper (II) acetate, copper (II) bromide, copper (II) acetylacetate, cupric ammonium chloride, copper carbonate, copper (II) Chloride, copper (II) citrate, copper (II) formate, copper (II) hydroxide, copper nitrate, copper naphthenate, copper oleate, copper maleate, copper phosphate, copper (II) sulfate, cuprous chloride, copper (I) cyanide, copper iodide, copper (I) oxide, copper thiocyanate, iron acetylacetonate, iron ammonium citrate, ferric ammonium oxalate, ferrous ammonium sulfate, ferric ammonium sulfate, iron citrate, iron fumarate, iron maleate, ferrous lactate, ferric nitrate, iron pentacarbonyl, ferric phosphate, and ferric pyrophosphate; metal oxides such as vanadium pentaoxide, copper (II) oxide, ferrous oxide, and ferric oxide; metal sulfides such as copper sulfide and iron sulfide; and copper powder and iron powder.

The above-mentioned metal ions may be used in combination with a chelating agent to adjust the concentration of the metal ions. Examples of the chelating agent that can be used in the present invention include polyphosphoric acid, pyrophosphoric acid, hexametaphosphoric acid, and tripolyphosphoric acid; aminocarboxylic acids such as ethylenediaminetetraacetic acid, nitrilotriacetic acid, and diethylenetriaminepentaacetic acid; phosphonic acid such as 1-hydroxyethylidene-1,1-diphosphonic acid and 2-phosphonobutane-1,2,4-tricarboxylic acid; organic acids such as fumaric acid, malic acid, citric acid, itaconic acid, oxalic acid, and crotonic acid; and polycarboxylic acids such as polyacrylic acid.

According to the process of the present invention, the polymerization temperature should be 50°-160° C., preferably 70°-160° C., and more preferably 85°-150° C. With a polymerization temperature lower than 50° C., polymerization does not proceed smoothly. With a polymerization temperature higher than 160° C., polymerization is accompanied by thermal decomposition. The solid contents in the polymerization system at the time of polymerization should be in the range of 30-99%, preferably 40-95%, so that the amount of residual maleic acid can be reduced further.

According to the process of the present invention, the polymerization proceeds as hydrogen peroxide (polymerization catalyst) is added. The polymerization evolves carbon dioxide, presumably as the result of decarbonization from the maleic acid and/or acid-type maleic acid polymer present in the polymerization system. The amount of the carbon dioxide evolved during polymerization is proportional to the amount of hydrogen peroxide added. Therefore, it is possible to control the amount of decarbonization by controlling the amount of hydrogen peroxide to be added. This, in turn, makes it possible to control, as required, the amount of carboxyl groups in the acid-type maleic acid polymer. This is a great advantage of the present invention because the acid-type maleic acid polymer can be made suitable for a broad range of applications by controlling the amount of carboxylic acid which greatly affects the physical properties and performance of the acid-type maleic acid polymer.

In the process of the present invention, hydrogen peroxide should be used in an amount of 8-100 g, preferably 10-80 g, and more preferably 15-50 g; per mol of the monomer component. With less than 8 g of hydrogen peroxide, the polymerization system will permit more maleic acid to remain unreacted. With more than 100 g of hydrogen peroxide, no additional effect is produced and excess hydrogen peroxide will remain in the polymerization system.

According to the process of the present invention, hydrogen peroxide should not be replaced by any other polymerization catalysts. It is impossible to obtain the high-quality acid-type polymaleic acid and acid-type maleic acid copolymer having a narrow molecular-weight distribution and a low molecular weight as in this invention, and the resulting polymer would contain an extremely large amount of residual monomer, if hydrogen peroxide is replaced by persulfate such as ammonium persulfate, sodium persulfate and potassium persulfate; azo compounds such as 2,2'-azobis -(2-amidinopropane) hydrochloride, 4,4'-azobis-4-cyanovaleric acid, azobisisobutyronitrile, and 2,2' -azobis-(4-methoxy-2,4-dimethylvaleronitrile; or organic peroxides such as benzoyl peroxide, lauroyl peroxide, peracetic acid, persuccinic acid, di-t-butyl peroxide, t-butylhydroperoxide, and cumenehydroperoxide.

There are no limitations on the method of feeding hydrogen peroxide to the polymerization system. It may be charged into the system all at once in the initial stage of the reaction, or continuously or by portions during the reaction. For the polymerization to proceed smoothly, continuous feeding is desirable and repetition of continuous feeding at certain intervals is more desirable. It is most desirable that the continuous feeding should be performed for a certain period of time, suspended for a while, and resumed. The feeding of hydrogen peroxide in this manner considerably decreases the amount of monomer which remains unreacted. There are no specific limitations on when, how long, and how often the feeding of hydrogen peroxide should be suspended, and also on the temperature of the system at the time of suspension. These parameters should be properly determined according to how the monomer component is being supplied to the system. The period of suspension should usually be 10-160 minutes, preferably 30-120 minutes; the frequency of suspension should be 1-3 times; and the temperature in the period of suspension should be 50°-160° C., preferably 85°-160° C., more preferably 100°-150° C. The feeding before and after suspension should continue for 10-200 minutes, preferably 20-120 minutes.

In the meantime, the above-cited Japanese Patent Laid-open No. 218407/1987 (U.S. Pat. No. 4659793) mentions that the combined use of iron and hydrogen peroxide as the polymerization catalyst is effective in reducing residual maleic acid in the synthesis of a salt of maleic acid-acrylic acid copolymer (in the ratio of 10-70/90-30 by weight). A disadvantage of this process is that the polymerization system should be kept at pH 2-7 to lower the amount of residual monomer and, on the other hand, the higher the ratio of maleic acid increases, the higher the pH value should be. In addition, this process yields a salt of maleic acid copolymer which is not suitable for use as a water-treating agent and detergent additive and is poor in biodegradability.

The process of the present invention which is carried out as mentioned above yields an acid-type maleic acid polymer which has a number-average molecular weight of 300-5000, preferably 400-3000, and a D-value smaller than 2.5, preferably smaller than 2.0. (The D-value represents the molecular weight distribution defined by $M_W/M_N$, where $M_W$=weight-average molecular weight and $M_N$=number-average molecular weight.)

The acid-type maleic acid polymer obtained as mentioned above may be used as such for a variety of applications. However, it may be neutralized with a proper basic compound according to the object of the use.

The acid-type maleic acid polymer obtained by the process of the present invention exhibits its outstanding properties when used as a detergent additive because it is highly miscible with a nonionic surface active agent in the detergent composition, or when used as a water-treating agent because it is less liable to gelation even when incorporated with zinc for the improvement of corrosion resistance. The acid-type maleic acid polymer obtained by the process of the present invention exhibits its outstanding properties (including good biodegradability) when used as a detergent additive and water-treating agent because it has a low molecular weight and a narrow molecular-weight distribution attributable to the unique polymerization conditions mentioned above. The acid-type maleic acid polymer obtained by the process of the present invention does not have any adverse effects (such as lowering of purity, separation of metal salt, and degradation of color) on the product with which it is used, because the process employs only a small amount of metal ion.

According to the process of the present invention, the acid-type maleic acid polymer is produced by polymerization in an aqueous solution. This process eliminates the possibility that the polymer contains residual organic solvents harmful to the human body, unlike the conventional process by which polymerization is performed in an organic solvent and then the organic solvent is replaced by water. The solventless process is shorter and less dangerous than the conventional process.

The process of the present invention yields the acid-type maleic acid polymer which will find use as a scouring assistant for cellulosic fiber, bleaching assistant for cellulosic fiber, pretreating agent for pulp bleaching, preparing agent for bentonite mud, deodorant (formed in combination with a polyvalent metal such as iron, copper, manganese, and zinc), dispersing agent for inorganic pigments, deinking assistant for waste paper regeneration, and chelating agent.

DETAILED DESCRIPTION OF THE PREFERRED EMBODIMENTS

Figure 1:
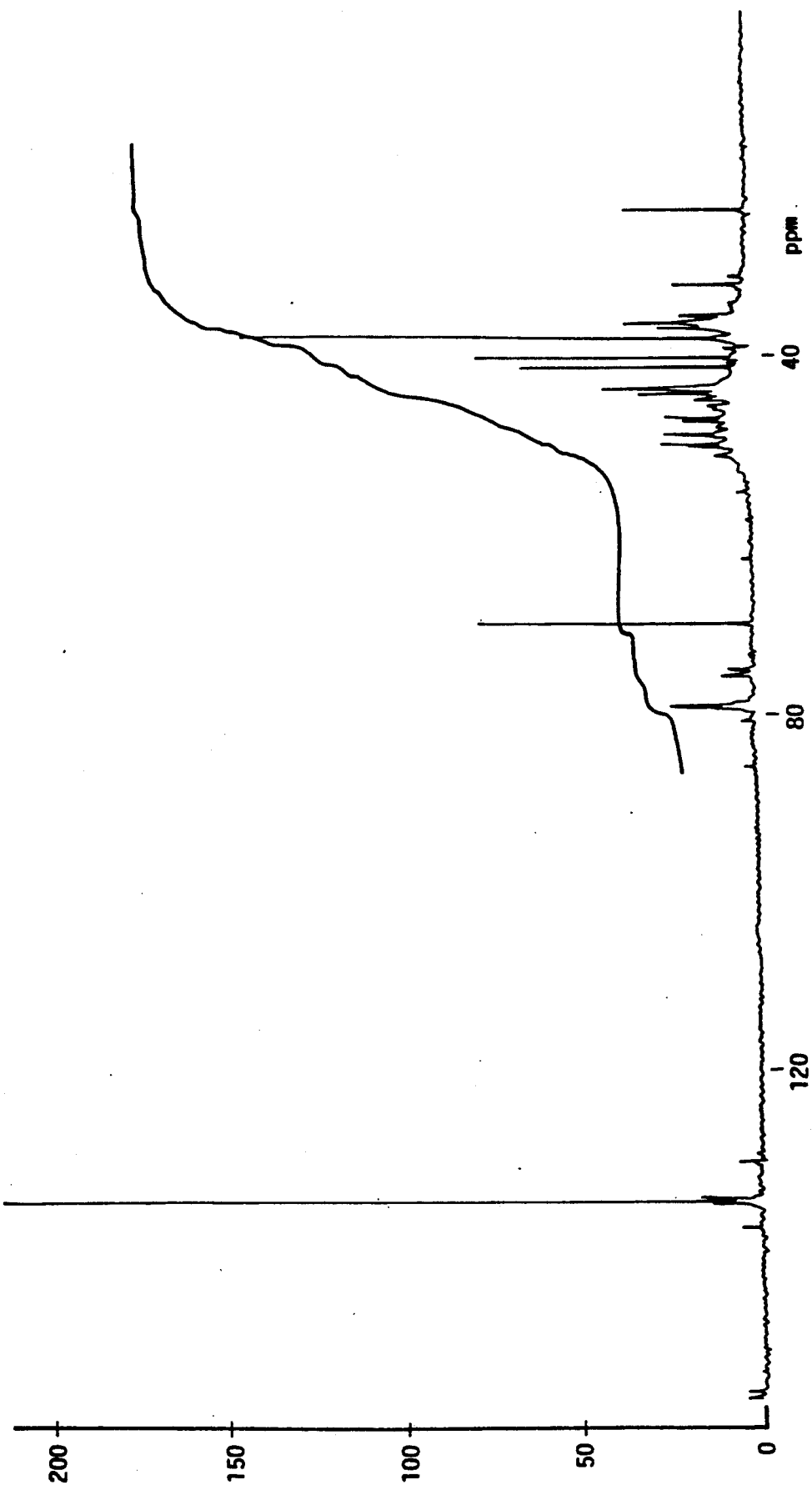
FIG. 1 is an NMR chart of the acid-type polymaleic acid (1) obtained in the example of the present invention.

The present invention will be described in more detail with reference to the following examples, which are not intended to restrict the scope of the invention. In Examples, "%" and "parts" mean "wt %" and "parts by weight", respectively.

EXAMPLE 1

A 1-liter four-neck flask equipped with a thermometer, stirrer, and reflux condensed was charged with 196 parts of maleic anhydride, 75.1 parts of water (to make 232 parts of maleic acid), and 0.01 parts of iron (III) ammonium sulfate dodecahydrate (equivalent to 5 ppm of $Fe^{3+}$ based on the amount of maleic acid charged). The resulting aqueous solution was heated with stirring to the boiling point under normal pressure. Then, 96.3 parts of 60% hydrogen peroxide (equivalent to 28.9 g for 1 mol of maleic acid charged) was added dropwise with stirring continuously over 3 hours, during which polymerization proceeded. Stirring was continued for another 1 hour at the boiling point of the system. After the completion of polymerization, there was obtained sample (1) of acid-type polymaleic acid containing 63% solids. The sample was tested for molecular weight and molecular-weight distribution by gel permeation chromatography under the following conditions. The results are shown in Table 1. Column: G-3000PW (XL)+G-2500PW (XL) made by Toso Co., Ltd., eluent: phosphate buffer solution (pH 7), and reference sample for molecular weight: polyethylene glycol (made by General Science Co., Ltd.)

EXAMPLES 2 TO 9

The same procedure as in Example 1 was repeated to give samples (2) to (9) of acid-type polymaleic acid, except that the amounts of iron (III) ammonium Sulfate dodecahydrate and hydrogen peroxide were changed as shown in Table 1. The samples were analyzed in the same way as in Example 1. The results are shown in Table 1.

EXAMPLE 10

The same procedure as in Example 1 was repeated to give sample (10) of acid-type polymaleic acid, except that the amount of iron (III) ammonium sulfate dodecahydrate was changed to 0.040 parts and it was added dropwise in the form of 0.40% aqueous solution (10 parts) simultaneously with hydrogen peroxide. The sample was analyzed in the same way as in Example 1. The results are shown in Table 1.

EXAMPLES 11 TO 14

The same procedure as in Example 1 was repeated to give samples (11) to (14) of acid-type polymaleic acid, except that the iron (III) ammonium sulfate dodecahydrate was replaced by iron (II) ammonium sulfate hexahydrate in an amount shown in Table 1 and the amount of hydrogen peroxide was changed as shown in Table 1. The samples were analyzed in the same way as in Example 1. The results are shown in Table 1.

EXAMPLES 15 TO 20

The same procedure as in Example 1 was repeated to give samples (15) to (20) of acid-type polymaleic acid, except that the iron (III) ammonium sulfate dodecahydrate was replaced by vanadyl sulfate in an amount shown in Table 1 and the amount of hydrogen peroxide was changed as shown in Table 1. The samples were analyzed in the same way as in Example 1. The results are shown in Table 1.

EXAMPLES 21 TO 23

The same procedure as in Example 1 was repeated to give samples (21) to (23) of acid-type polymaleic acid, except that the iron (III) ammonium sulfate dodecahydrate was replaced by copper (II) ammonium sulfate pentahydrate in an amount shown in Table 1 and the amount of hydrogen peroxide was changed as shown in Table 1. The samples were analyzed in the same way as in Example 1. The results are shown in Table 1.

EXAMPLE 24

The same procedure as in Example 1 was repeated to give sample (24) of acid-type polymaleic acid, except that the amount of iron (III) ammonium sulfate dodecahydrate was changed to 0.9 parts (equivalent to 450 ppm of $Fe^{3+}$ based on the amount of maleic acid charged). The sample was analyzed in the same way as in Example 1. The results are shown in Table 1.

TABLE 1

| Example | Acid-type maleic acid sample | Molar ratio of NaOH to maleic acid[*1] | Amount of metal ion (ppm)[*2] | Metal ion (Method of addition)[*3] | Amount of hydrogen peroxide (g)[*4] | Amount of residual maleic acid (%)[*5] | $M_W$ | $M_N$ | D value ($M_W/M_N$) |
|---|---|---|---|---|---|---|---|---|---|
| 1  | (1)  | 0 (0.3) | 5   | $Fe^{3+}$ (1) | 28.9 | 3.0  | 1200 | 950  | 1.26 |
| 2  | (2)  | 0 (0.3) | 1   | $Fe^{3+}$ (1) | 28.9 | 8.5  | 1220 | 960  | 1.27 |
| 3  | (3)  | 0 (0.3) | 20  | $Fe^{3+}$ (1) | 28.9 | 2.5  | 1200 | 960  | 1.25 |
| 4  | (4)  | 0 (0.3) | 60  | $Fe^{3+}$ (1) | 28.9 | 2.5  | 1250 | 940  | 1.33 |
| 5  | (5)  | 0 (0.3) | 300 | $Fe^{3+}$ (1) | 28.9 | 2.5  | 1920 | 1380 | 1.39 |
| 6  | (6)  | 0 (0.3) | 5   | $Fe^{3+}$ (1) | 12.0 | 10.0 | 1210 | 950  | 1.27 |
| 7  | (7)  | 0 (0.3) | 60  | $Fe^{3+}$ (1) | 12.0 | 5.0  | 1280 | 950  | 1.34 |
| 8  | (8)  | 0 (0.3) | 1   | $Fe^{3+}$ (1) | 80.0 | 3.5  | 930  | 650  | 1.43 |
| 9  | (9)  | 0 (0.3) | 5   | $Fe^{3+}$ (1) | 80.0 | 0.5  | 1010 | 740  | 1.36 |
| 10 | (10) | 0 (0.3) | 20  | $Fe^{3+}$ (2) | 28.9 | 2.8  | 1200 | 960  | 1.25 |
| 11 | (11) | 0 (0.3) | 5   | $Fe^{2+}$ (1) | 28.9 | 3.5  | 1200 | 950  | 1.26 |
| 12 | (12) | 0 (0.3) | 1   | $Fe^{2+}$ (1) | 28.9 | 10.0 | 1220 | 960  | 1.27 |
| 13 | (13) | 0 (0.3) | 20  | $Fe^{2+}$ (1) | 28.9 | 3.0  | 1200 | 960  | 1.25 |
| 14 | (14) | 0 (0.3) | 300 | $Fe^{2+}$ (1) | 28.9 | 2.9  | 2000 | 1400 | 1.43 |
| 15 | (15) | 0 (0.3) | 1   | $VO^{2+}$ (1) | 28.9 | 5.5  | 1200 | 960  | 1.25 |
| 16 | (16) | 0 (0.3) | 20  | $VO^{2+}$ (1) | 28.9 | 0.5  | 1200 | 960  | 1.25 |
| 17 | (17) | 0 (0.3) | 60  | $VO^{2+}$ (1) | 28.9 | 0.5  | 1220 | 950  | 1.28 |
| 18 | (18) | 0 (0.3) | 200 | $VO^{2+}$ (1) | 28.9 | 0.5  | 1780 | 1300 | 1.37 |
| 19 | (19) | 0 (0.3) | 20  | $VO^{2+}$ (1) | 12.0 | 3.5  | 1210 | 960  | 1.26 |
| 20 | (20) | 0 (0.3) | 20  | $VO^{2+}$ (1) | 60.0 | 0.2  | 1080 | 820  | 1.32 |
| 21 | (21) | 0 (0.3) | 1   | $Cu^{2+}$ (1) | 28.9 | 12.0 | 1220 | 950  | 1.28 |
| 22 | (22) | 0 (0.3) | 20  | $Cu^{2+}$ (1) | 28.9 | 5.5  | 1210 | 950  | 1.27 |
| 23 | (23) | 0 (0.3) | 200 | $Cu^{2+}$ (1) | 28.9 | 3.5  | 1890 | 1350 | 1.40 |
| 24 | (24) | 0 (0.3) | 450 | $Fe^{3+}$ (1) | 28.9 | 3.8  | 2980 | 2000 | 1.49 |

[*1] Represents the degree of neutralization of the monomer charged. The parenthesized number denotes the pH at the time of polymerization (measured without dilution at 80° C.).
[*2] ppm (as metal ion) based on the amount of maleic acid.
[*3] (1) indicates that the metal ion was added all at once at the initial stage of polymerization, and (2) indicates that the metal ion was added dropwise continuously.
[*4] g per mol of maleic acid.
[*5] % based on the amount of maleic acid charged.

It is noted from Table 1 that the acid-type polymaleic acid obtained by the process of the present invention has a number-average molecular weight of 300–5000, preferably 400–3000, and a D-value lower than 2.5, preferably 2.0, which is defined by $M_W/M_N$, where $M_W$ is a weight-average molecular weight and $M_N$ is a number-average molecular weight. The weight-average molecular weight and number-average molecular weight are those values which are obtained when polyethylene glycol was used as the reference sample for molecular weight in gel permeation chromatography.

COMPARATIVE EXAMPLE 1

The same procedure as in Example 1 was repeated to give comparative sample (1) of polymaleic acid, except that the iron (III) ammonium sulfate dodecahydrate was replaced by iron (II) ammonium Sulfate hexahydrate in an amount of 8.2 parts (equivalent to 5000 ppm of $Fe^{2+}$ based on the amount of maleic acid charged). The sample was analyzed in the same way as in Example 1. The results are shown in Table 2.

COMPARATIVE EXAMPLE 2

The same procedure as in Example 1 was repeated to give comparative sample (2) of polymaleic acid, except that the amount of iron (III) ammonium sulfate dodecahydrate was changed to 10.0 parts (equivalent to 5000 ppm of $Fe^{3+}$ based on the amount of maleic acid charged). The sample was analyzed in the same way as in Example 1. The results are shown in Table 2.

COMPARATIVE EXAMPLES 3 AND 4

The same procedure as in Example 1 was repeated to give comparative samples (3) and (4) of polymaleic acid, except that iron (III) ammonium sulfate dodecahydrate was not used at all and the amount of 60% hydrogen peroxide was changed as shown in Table 2. The sample was analyzed in the same way as in Example 1. The results are shown in Table 2.

COMPARATIVE EXAMPLE 5

The same procedure as in Example 1 was repeated to give comparative sample (5) of polymaleate, except that iron (III) ammonium sulfate dodecahydrate was not used at all and maleic acid was charged together with 167 parts of 48% aqueous solution of sodium hydroxide so that 50 mol % of carboxyl groups in maleic acid was neutralized. The sample was analyzed in the same way as in Example 1. The results are shown in Table 2.

COMPARATIVE EXAMPLE 6

The same procedure as in Comparative Example 5 was repeated to give comparative sample (6) of polymaleate, except that iron (II) ammonium sulfate hexahydrate was added in an amount of 0.0082 parts (equivalent to 5 ppm of $Fe^{2+}$ based on the amount of maleic acid charged). The sample was analyzed in the same way as in Example 1. The results are shown in Table 2.

COMPARATIVE EXAMPLE 7

The same procedure as in Comparative Example 5 was repeated to give comparative sample (7) of polymaleate, except that iron (III) ammonium sulfate dodecahydrate was added in an amount of 0.010 parts (equivalent to 5 ppm of $Fe^{3+}$ based on the amount of maleic acid charged). The sample was analyzed in the same way as in Example 1. The results are shown in Table 2.

COMPARATIVE EXAMPLE 8

A flask equipped with a thermometer, stirrer, dropping funnel, nitrogen inlet, and reflux condenser was charged with 196 parts of maleic anhydride and 300 parts of water (to make 232 parts of maleic acid). The resulting aqueous solution was heated with stirring to 60° C. Subsequently, 138 parts of 30% aqueous solution of sodium hydroxide was added and then 140 parts of isopropanol was added. With the system heated to the refluxing temperature, 0.25 parts of 4.98% (1% as $Fe^{2+}$) aqueous solution of ferrous sulfate ($FeSO_4 \cdot 7H_2O$) was added. Finally, 40 parts of 60% hydrogen peroxide was added dropwise over 6 hours. Heating was continued for another 2 hours, and residual isopropanol was expelled. Thus, there was obtained comparative sample (8) of polymaleate. The sample was analyzed in the same way as in Example 1. The results are shown in Table 2.

COMPARATIVE EXAMPLE 9

The same procedure as in Example 1 was repeated to give comparative sample (9) of polymaleic acid, except that the iron (III) ammonium sulfate dodecahydrate was replaced by vanadyl sulfate in an amount shown in Table 2 and the amount of hydrogen peroxide was changed as shown in Table 2. The sample was analyzed in the same way as in Example 1. The results are shown in Table 2.

COMPARATIVE EXAMPLE 10

The same apparatus as in Example 1 was charged with 196 parts of maleic anhydride, 131 parts of monochlorobenzene was added dropwise over 3 hours, and 65.4 parts of xylene, followed by heating to 140° C. To the system a mixture composed of 65.4 parts of di-t-butyl peroxide, 41 parts of xylene, and 65.4 parts of monochlorobenzene, followed by aging for 3 hours at the boiling point. The solvents were distilled away, and 197 parts of pure water was added for hydrolysis to give comparative sample (10) of polymaleic acid. The sample was analyzed in the same way as in Example 1. The results are shown in Table 2.

Thus there was obtained a supersaturated aqueous solution containing 530 ppm of calcium carbonate. It was heated at 70° C. for 3 hours. After cooling, precipitates were filtered off through a 0.1 μm membrane filter, and the filtrate was analyzed according to JIS K0101. The scale suppressing ratio (%) was calculated from the following equation. The results are shown in Table 3.

Scale suppressing ratio (%) = (C − B) ÷ (A − B)

where,
A : concentration of calcium in the solution before testing;
B : concentration of calcium in the filtrate of the solution containing no antiscale agent; and
C : concentration of calcium in the filtrate after testing

TABLE 3

| Example | Polymaleic acid sample used | Calcium carbonate scale suppressing ratio (%) |
|---|---|---|
| 25 | Acid-type polymaleic acid (1) | 81.2 |
| 26 | Acid-type polymaleic acid (2) | 78.5 |
| 27 | Acid-type polymaleic acid (3) | 81.5 |
| 28 | Acid-type polymaleic acid (4) | 79.5 |
| 29 | Acid-type polymaleic acid (5) | 73.5 |
| 30 | Acid-type polymaleic acid (6) | 79.1 |
| 31 | Acid-type polymaleic acid (7) | 81.0 |
| 32 | Acid-type polymaleic acid (8) | 81.4 |
| 33 | Acid-type polymaleic acid (9) | 81.6 |
| 34 | Acid-type polymaleic acid (10) | 79.5 |
| 35 | Acid-type polymaleic acid (11) | 80.5 |
| 36 | Acid-type polymaleic acid (12) | 75.7 |
| 37 | Acid-type polymaleic acid (13) | 80.7 |
| 38 | Acid-type polymaleic acid (14) | 72.8 |
| 39 | Acid-type polymaleic acid (15) | 78.8 |
| 40 | Acid-type polymaleic acid (16) | 85.3 |
| 41 | Acid-type polymaleic acid (17) | 84.1 |
| 42 | Acid-type polymaleic acid (18) | 73.5 |
| 43 | Acid-type polymaleic acid (19) | 82.0 |
| 44 | Acid-type polymaleic acid (20) | 84.5 |
| 45 | Acid-type polymaleic acid (21) | 75.1 |
| 46 | Acid-type polymaleic acid (22) | 79.8 |
| 47 | Acid-type polymaleic acid (23) | 73.0 |
| 48 | Acid-type polymaleic acid (24) | 75.3 |

TABLE 2

| Comparative Example | Comparative polymaleic acid (salt) sample | Molar ratio of NaOH to maleic acid*1 | Amount of metal ion (ppm)*2 | Metal ion (Method of addition)*3 | Amount of hydrogen peroxide (g)*4 | Amount of residual maleic acid (%)*5 | $M_W$ | $M_N$ | D value ($M_W/M_N$) |
|---|---|---|---|---|---|---|---|---|---|
| 1 | (1) | 0 (0.3) | 5000 | $Fe^{2+}$ (1) | 28.9 | 5.0 | 3000 | 1230 | 2.44 |
| 2 | (2) | 0 (0.3) | 5000 | $Fe^{3+}$ (1) | 28.9 | 4.7 | 2480 | 1210 | 2.05 |
| 3 | (3) | 0 (0.3) | — | — | 28.9 | 45.0 | 1220 | 960 | 1.27 |
| 4 | (4) | 0 (0.3) | — | — | 60.0 | 20.0 | 1220 | 950 | 1.28 |
| 5 | (5) | 1.0 (4.5) | — | — | 28.9 | 6.0 | 3500 | 1300 | 2.70 |
| 6 | (6) | 1.0 (4.5) | 5 | $Fe^{2+}$ (1) | 28.9 | 2.5 | 3480 | 1280 | 2.70 |
| 7 | (7) | 1.0 (4.5) | 5 | $Fe^{3+}$ (1) | 28.9 | 4.0 | 3510 | 1260 | 2.78 |
| 8 | (8) | 0.52 (4.0) | 10.8 | $Fe^{2+}$ (1) | 12.0 | 15.0 | 3100 | 1210 | 2.56 |
| 9 | (9) | 0 (0.3) | 20 | $VO^{2+}$ (1) | 5 | 30.0 | 1250 | 960 | 1.30 |
| 10 | (10) | 0 (—) | 0 | — | — | 20.0 | 2050 | 1220 | 1.68 |

*1Represents the degree of neutralization of the monomer charged. The parenthesized number denotes the pH at the time of polymerization (measured without dilution at 80° C.).
*2ppm (as metal ion) based on the amount of maleic acid.
*3(1) indicates that the metal ion was added all at once at the initial stage of polymerization.
*4g per mol of maleic acid.
*5% based on the amount of maleic acid charged.

EXAMPLES 25 TO 48

The performance of samples (1) to (24) of acid-type polymaleic acid obtained in Examples 1 to 24 as the anti-scale agent was evaluated by the following test. Each sample was dissolved in water to give a 0.02% aqueous solution. Three grams of the solution (equivalent to 3 ppm of the resulting supersaturated aqueous solution) was mixed with 170 g of water and 10 g of 1.56% aqueous solution of calcium chloride dihydrate in a 225-ml glass bottle. To the mixture was further added 10 g of 3% aqueous solution of sodium bicarbonate and 7 g of water to bring the total amount to 200 g.

COMPARATIVE EXAMPLES 11 TO 20

The performance of comparative samples (1) to (10) of polymaleic acid (salt) obtained in Comparative Examples 1 to 10 as the anitscale agent was evaluated in the same manner as in Examples 24 to 48. The results are shown in Table 4.

TABLE 4

| Comparative Example | Polymaleic acid (salt) sample used | Calcium carbonate scale suppressing ratio (%) |
| --- | --- | --- |
| 11 | Comparative polymaleic acid (1) | 60.0 |
| 12 | Comparative polymaleic acid (2) | 61.2 |
| 13 | Comparative polymaleic acid (3) | 59.5 |
| 14 | Comparative polymaleic acid (4) | 65.0 |
| 15 | Comparative polymaleate (5) | 41.0 |
| 16 | Comparative polymaleate (6) | 43.0 |
| 17 | Comparative polymaleate (7) | 42.0 |
| 18 | Comparative polymaleate (8) | 55.9 |
| 19 | Comparative polymaleic acid (9) | 66.8 |
| 20 | Comparative polymaleic acid (10) | 68.2 |

COMPARATIVE EXAMPLES 49 TO 72

The performance of samples (1) to (24) of acid-type polymaleic acid obtained in Examples 1 to 24 as the detergent builder was evaluated by the following test. Each sample (10 mg in terms of solids) was added to 50 ml of aqueous solution containing $10^{-3}$ mol/L of calcium chloride. The amount of calcium ions sequestered by the sample was determined by means of an ion analyzer (Model 701, made by Orion Co., Ltd.) and a calcium ion electrode. The chelating ability of the acid-type polymaleic acid was calculated from the following equation. The results are shown in Table 5.

Chelating ability =

$$\frac{\text{Amount (mg) of sequestered calcium (as } CaCO_3)}{\text{Amount (g) of acid-type polymaleic acid (as solids)}}$$

TABLE 5

| Example | Acid-type polymaleic acid | Chelating ability [mg · CaCO$_3$/g] |
| --- | --- | --- |
| 49 | Acid-type polymaleic acid (1) | 230 |
| 50 | Acid-type polymaleic acid (2) | 220 |
| 51 | Acid-type polymaleic acid (3) | 231 |
| 52 | Acid-type polymaleic acid (4) | 229 |
| 53 | Acid-type polymaleic acid (5) | 222 |
| 54 | Acid-type polymaleic acid (6) | 220 |
| 55 | Acid-type polymaleic acid (7) | 224 |
| 56 | Acid-type polymaleic acid (8) | 221 |
| 57 | Acid-type polymaleic acid (9) | 230 |
| 58 | Acid-type polymaleic acid (10) | 231 |
| 59 | Acid-type polymaleic acid (11) | 223 |
| 60 | Acid-type polymaleic acid (12) | 218 |
| 61 | Acid-type polymaleic acid (13) | 224 |
| 62 | Acid-type polymaleic acid (14) | 220 |
| 63 | Acid-type polymaleic acid (15) | 236 |
| 64 | Acid-type polymaleic acid (16) | 238 |
| 65 | Acid-type polymaleic acid (17) | 234 |
| 66 | Acid-type polymaleic acid (18) | 239 |
| 67 | Acid-type polymaleic acid (19) | 230 |
| 68 | Acid-type polymaleic acid (20) | 238 |
| 69 | Acid-type polymaleic acid (21) | 212 |
| 70 | Acid-type polymaleic acid (22) | 228 |
| 71 | Acid-type polymaleic acid (23) | 225 |
| 72 | Acid-type polymaleic acid (24) | 228 |

COMPARATIVE EXAMPLES 21 TO 30

The performance of samples (1) to (10) of comparative polymaleic acid (salt) obtained in Comparative Examples 1 to 10 as the detergent builder was evaluated in the same manner as in Examples 49 to 72. The results are shown in Table 6.

TABLE 6

| Comparative Example | Comparative polymaleic acid (salt) | Chelating ability [mg · CaCO$_3$/g] |
| --- | --- | --- |
| 21 | Comparative polymaleic acid (1) | 173 |
| 22 | Comparative polymaleic acid (2) | 168 |
| 23 | Comparative polymaleic acid (3) | 95 |
| 24 | Comparative polymaleic acid (4) | 113 |
| 25 | Comparative polymaleate (5) | 150 |
| 26 | Comparative polymaleate (6) | 168 |
| 27 | Comparative polymaleate (7) | 165 |
| 28 | Comparative polymaleate (8) | 170 |
| 29 | Comparative polymaleic acid (9) | 132 |
| 30 | Comparative polymaleic acid (10) | 180 |

The acid-type polymaleic acid (1) obtained in Example 1 was examined by $^{13}$C-NMR The NMR. chart is shown in FIG. 1. The chart shows a peak at 30-40 ppm which indicates the carbon of $CH_2$. This suggests that the acid-type polymaleic acid (1) contains the acrylic acid structure originating from the decarbonization that took place at the time of polymerization.

EXAMPLE 73

A 1-liter four-neck flask equipped with a thermometer, stirrer, and reflux condenser was charged with 196 parts of maleic anhydride, 75.1 parts of water (to make 232 parts of maleic acid), and 0.0153 parts of vanadyl sulfate dihydrate (equivalent to 20 ppm of $VO^{2+}$ based on the amount of monomer component). The resulting aqueous solution was heated with stirring to the boiling point under normal pressure. Then, 76.7 parts of 60% hydrogen peroxide (equivalent to 20 g per mol of the monomer component) and 26 parts of 3-methyl-3-buten-1-ol (isoprenol) were added dropwise with stirring continuously over 3 hours, during which polymerization proceeded Stirring was continued for another 1 hour at the boiling point of the system. After the completion of polymerization, there was obtained sample (73) of acid-type maleic acid copolymer containing 71% solids. The polymerization was carried out at pH 0.3

The thus obtained sample (73) was tested for molecular weight and molecular-weight distribution by gel permeation chromatography under the same conditions as mentioned above. The results are shown in Table 7.

The biodegradability of sample (73) was calculated from the following formula.

$$X = (D-E) + (F-G) \times 100$$

X : ratio (%) of biodegradation that took place in 5 days

D : biological oxygen demand (BOD 5) by the acid-type maleic acid copolymer for 5 days. (*1)

E : biological oxygen demand by the residual monomer for 5 days. (*2)

F : theoretical oxygen demand by the acid-type maleic acid copolymer (*3)

G : theoretical oxygen demand by the residual monomer (*1) Measured according to JIS K-0102.

(*2) The amount of the residual monomer was determined by gel permeation chromatography and gas chromatography. The biological oxygen demand by each monomer component was measured according to JIS K-0102, and the biological oxygen demand by the total amount of the residual monomers was calculated.

(*3) The amount of oxygen necessary for complete oxidation was calculated from the data of elemental analysis of the acid-type maleic acid copolymer.

EXAMPLES 74 AND 75

The same procedure as in Example 73 was repeated to give samples (74) and (75) of acid-type maleic acid copolymer, except that the amount of vanadyl sulfate dihydrate was changed as shown in Table 7. The samples were analyzed in the same way as in Example 73. The results are shown in Table 7.

EXAMPLE 76

The same procedure as in Example 73 was repeated to give sample (76) of acid-type maleic acid copolymer, except that the vanadyl sulfate dihydrate was replaced by 10 parts of 0.45% aqueous solution of iron (II;) ammonium sulfate dodecahydrate (equivalent to 20 ppm of $Fe^{3+}$ based on the amount of monomer component), and it was added dropwise together with hydrogen peroxide. The sample was analyzed in the same way as in Example 73. The results are shown in Table 7.

EXAMPLE 77

The same procedure as in Example 73 was repeated to give sample (77) of acid-type maleic acid copolymer, except that the vanadyl sulfate dihydrate was replaced by 0.045 parts of iron (III) ammonium sulfate dodecahydrate (equivalent to 20 ppm of $Fe^{3+}$ based on the amount of monomer component). The sample was analyzed in the same way as in Example 73. The results are shown in Table 7.

EXAMPLE 78

The same procedure as in Example 73 was repeated to give sample (78) of acid-type maleic acid copolymer, except that the vanadyl sulfate dihydrate was replaced by 0.013 parts of anhydrous copper (II) sulfate (equivalent to 20 ppm of $Cu^{2+}$ based on the amount of monomer component). The sample was analyzed in the same way as in Example 73. The results are shown in Table 7.

EXAMPLES 79 AND 80

The same procedure as in Example 73 was repeated to give samples (79) and (80) of acid-type maleic acid copolymer, except that the vanadyl sulfate dihydrate was replaced by 0.045 parts of iron (III) ammonium sulfate dodecahydrate and the amount of hydrogen peroxide was changed as shown in Table 7. The samples were analyzed in the same way as in Example 73. The results are shown in Table 7.

EXAMPLE 81

The same procedure as in Example 73 was repeated to give sample (81) of acid-type maleic acid copolymer, except that 0.005 g of 1-hydroxyethylidene-1,1-diphosphonic acid (as a chelating agent) was added in the initial stage of charging. The sample was analyzed in the same way as in Example 73. The results are shown in Table 7.

EXAMPLE 82

The same procedure as in Example 73 was repeated to give sample (82) of acid-type maleic acid copolymer, except that hydrogen peroxide was added in the following manner. At first, dropping was continued for 1.5 hours; dropping was suspended for 60 minutes, during which the reaction temperature was kept at the boiling point (110° C.); and dropping was resumed and continued for 1.5 hours. The sample was analyzed in the same way as in Example 73. The results are shown in Table 7.

EXAMPLES 83 AND 84

The same procedure as in Example 73 was repeated to give samples (83) and (84) of acid-type maleic acid copolymer, except that the vanadyl sulfate dihydrate was replaced by 0.045 parts of iron (III) ammonium sulfate dodecahydrate and the amounts of monomer and hydrogen peroxide were changed as shown in Table 7. The samples were analyzed in the same way as in Example 73. The results are shown in Table 7.

EXAMPLES 85 AND 99

The same procedure as in Example 73 was repeated to give samples (85) to (99) of acid-type maleic acid copolymer, except that the kind and amount of monomer and metal ion were changed as shown in Table 7. The samples were analyzed in the same way as in Example 73. The results are shown in Table 7.

TABLE 7

| | | (Part 1) | | | |
|---|---|---|---|---|---|
| Example | Acid-type maleic acid copolymer | Other water-soluble unsaturated monomer (B) | Ratio of (A)/(B) (by weight)*1 | Metal ion (Method of addition)*2 | Amount of metal ion (ppm)*3 |
| 73 | (73) | Isoprenol | 90/10 | $VO^{2+}$ (1) | 20 |
| 74 | (74) | Isoprenol | 90/10 | $VO^{2+}$ (1) | 2 |
| 75 | (75) | Isoprenol | 90/10 | $VO^{2+}$ (1) | 400 |
| 76 | (76) | Isoprenol | 90/10 | $Fe^{3+}$ (2) | 20 |
| 77 | (77) | Isoprenol | 90/10 | $Fe^{3+}$ (1) | 20 |
| 78 | (78) | Isoprenol | 90/10 | $Cu^{2+}$ (1) | 20 |
| 79 | (79) | Isoprenol | 90/10 | $Fe^{3+}$ (1) | 20 |
| 80 | (80) | Isoprenol | 90/10 | $Fe^{3+}$ (1) | 20 |
| 81 | (81) | Isoprenol | 90/10 | $VO^{2+}$ (1) | 20 |
| 82 | (82) | Isoprenol | 90/10 | $VO^{2+}$ (1) | 20 |
| 83 | (83) | Isoprenol | 99/1 | $Fe^{3+}$ (1) | 20 |
| 84 | (84) | Isoprenol | 50/50 | $Fe^{3+}$ (1) | 20 |
| 85 | (85) | Isoprenol EO-5 mol adduct | 90/10 | $VO^{2+}$ (1) | 20 |
| 86 | (86) | Isoprenol EO-5 mol adduct | 90/10 | $Fe^{3+}$ (1) | 20 |
| 87 | (87) | Isoprenol EO-5 mol adduct | 90/10 | $Cu^{2+}$ (1) | 20 |
| 88 | (88) | Glycerol monoallyl ether | 90/10 | $Fe^{3+}$ (1) | 20 |
| 89 | (89) | Glycerol monoallyl ether EO-5 mol adduct | 90/10 | $Fe^{2+}$ (1) | 20 |
| 90 | (90) | Acrylic acid | 90/10 | $VO^{2+}$ (1) | 20 |
| 91 | (91) | Acrylic acid | 70/30 | $Fe^{3+}$ (1) | 20 |
| 92 | (92) | Acrylic acid | 70/30 | $Cu^{2+}$ (1) | 20 |
| 93 | (93) | Methacrylic acid | 90/10 | $VO^{2+}$ (1) | 20 |

TABLE 7-continued

| | | | | | |
|---|---|---|---|---|---|
| 94 | (94) | 3-allyloxy-2-hydroxy-propanesulfonic acid | 98/2 | $VO^{2+}$ (1) | 20 |
| 95 | (95) | 3-allyloxy-2-hydroxy-propanesulfonic acid | 90/10 | $Fe^{3+}$ (1) | 20 |
| 96 | (96) | 3-allyloxy-2-hydroxy-propanesulfonic acid | 90/10 | $Cu^{2+}$ (1) | 20 |
| 97 | (97) | Vinyl acetate | 90/10 | $VO^{2+}$ (1) | 20 |
| 98 | (98) | Vinyl acetate | 80/20 | $Fe^{3+}$ (1) | 20 |
| 99 | (99) | Vinyl acetate | 80/20 | $Cu^{2+}$ (1) | 20 |

*[1](A): maleic acid, (B): other water-soluble unsaturated monomer.
*[2](1) indicates that the metal ion was added all at once at the initial stage of polymerization, and (2) indicates that the metal ion was added dropwise continuously.
*[3]ppm (as metal ion) based on the amount of monomer components.

(Part 2)

| Example | Amount of hydrogen peroxide (g/mol monomer) | Amount of residual monomer (wt %/monomer) | pH at polymerization time (undiluted, at 80° C.) | $M_W$ | $M_N$ | D value ($M_W/M_N$) | Ratio of biodegradation (%) |
|---|---|---|---|---|---|---|---|
| 73 | 20 | 2 | 0.3 | 2800 | 1900 | 1.47 | 17 |
| 74 | 20 | 10 | 0.3 | 2850 | 1900 | 1.50 | 10 |
| 75 | 20 | 5 | 0.3 | 4780 | 2300 | 2.08 | 9 |
| 76 | 20 | 7 | 0.3 | 2900 | 1950 | 1.49 | 16 |
| 77 | 20 | 5 | 0.4 | 2800 | 1850 | 1.51 | 17 |
| 78 | 20 | 7 | 0.2 | 2750 | 1800 | 1.53 | 16 |
| 79 | 80 | 2 | 0.3 | 1680 | 1100 | 1.53 | 14 |
| 80 | 8 | 10 | 0.2 | 2750 | 1800 | 1.53 | 10 |
| 81 | 20 | 1.5*[1] | 0.3 | 2800 | 1900 | 1.47 | 17 |
| 82 | 20 | 1.0*[2] | 0.3 | 2700 | 1800 | 1.50 | 17 |
| 83 | 80 | 3 | 0.2 | 1090 | 690 | 1.58 | 15 |
| 84 | 20 | 10 | 0.3 | 3610 | 2100 | 1.72 | 10 |
| 85 | 20 | 2 | 0.3 | 2600 | 1900 | 1.36 | 17 |
| 86 | 20 | 6 | 0.3 | 2650 | 1900 | 1.40 | 17 |
| 87 | 20 | 8 | 0.3 | 2600 | 1800 | 1.44 | 16 |
| 88 | 20 | 3 | 0.3 | 2800 | 1950 | 1.44 | 16 |
| 89 | 20 | 5 | 0.3 | 2750 | 1800 | 1.53 | 15 |
| 90 | 20 | 1.5 | 0.2 | 2900 | 1900 | 1.52 | 16 |
| 91 | 20 | 2 | 0.2 | 3950 | 2500 | 1.58 | 17 |
| 92 | 20 | 5 | 0.2 | 4090 | 3100 | 1.61 | 15 |
| 93 | 20 | 2 | 0.2 | 2800 | 1900 | 1.47 | 15 |
| 94 | 20 | 2 | 0.2 | 2120 | 1210 | 1.75 | 15 |
| 95 | 20 | 3 | 0.2 | 2600 | 1500 | 1.73 | 16 |
| 96 | 20 | 7 | 0.2 | 2550 | 1500 | 1.70 | 15 |
| 97 | 20 | 3 | 0.2 | 2680 | 1850 | 1.45 | 17 |
| 98 | 20 | 5 | 0.2 | 2720 | 1890 | 1.44 | 20 |
| 99 | 20 | 8 | 0.2 | 2710 | 1840 | 1.47 | 16 |

*[1]A chelating agent was added.
*[2]The addition of hydrogen peroxide was temporarily suspended.

COMPARATIVE EXAMPLE 31

The same procedure as in Example 73 was repeated to give comparative sample (31) of maleic acid copolymer, except that 166.6 parts of 48% aqueous solution of sodium hydroxide (required to neutralize half the carboxylic acid) was added. The sample was analyzed in the same way as in Example 73. The results are shown in Table 8.

COMPARATIVE EXAMPLE 32

The same procedure as in Example 73 was repeated to give comparative sample (32) of acid-type maleic acid copolymer, except that the vanadyl sulfate dihydrate was not used. The sample was analyzed in the same way as in Example 73. The results are shown in Table 8.

COMPARATIVE EXAMPLE 33

The same procedure as in Example 73 was repeated to give comparative sample (33) of maleic acid copolymer, except that the amount of vanadyl sulfate dihydrate was changed to 2.30 parts. The sample was analyzed in the same way as in Example 73. The results are shown in Table 8.

COMPARATIVE EXAMPLES 34 TO 37

The same procedure as in Example 73 was repeated to give comparative samples (34) to (37) of maleic acid copolymer, except that the vanadyl sulfate dihydrate was replaced by the metal ion as shown in Table 8. The samples were analyzed in the same way as in Example 73. The results are shown in Table 8.

COMPARATIVE EXAMPLES 38 TO 44

The same procedure as in Example 73 was repeated to give comparative samples (38) to (41) of maleic acid copolymer, except that the hydrogen peroxide as replaced by the peroxide as shown in Table 8. The samples were analyzed in the same way as in Example 73. The results are shown in Table 8.

COMPARATIVE EXAMPLE 42

The same procedure as in Example 73 was repeated to give comparative sample (42) of maleic acid copolymer, except that 26.0 parts of acrylic acid was used as the water-soluble unsaturated monomer, the vanadyl sulfate was not used, and the amount of the hydrogen peroxide was changed as shown in Table 8. The sample was analyzed in the same way as in Example 73. The results are shown in Table 8.

COMPARATIVE EXAMPLE 43

The same procedure as in Example 73 was repeated to give comparative sample (43) of maleic acid copolymer salt, except that 26.0 parts of acrylic acid was used as the water-soluble unsaturated monomer, 181.7 parts of 48% aqueous solution of sodium hydroxide (required to neutralize half the carboxylic acid) was added, and the amount of the hydrogen peroxide was changed as shown in Table 8. The sample was analyzed in the same way as in Example 73. The results are shown in Table 8.

COMPARATIVE EXAMPLE 44

The same procedure as in Example 73 was repeated to give comparative sample (44) of maleic acid copolymer salt, except that 26.0 parts of acrylic acid was used as the water-soluble unsaturated monomer, 2.30 parts of vanadyl sulfate dihydrate (3000 ppm (as $VO^{2+}$) of the monomer component) was used, and the amount of the hydrogen peroxide was changed as shown in Table 8. The sample was analyzed in the same way as in Example 73. The results are shown in Table 8.

COMPARATIVE EXAMPLE 45

The same procedure as in Example 73 was repeated to give comparative sample (45) of maleic acid copolymer, except that 26.0 parts of acrylic acid was used as the water-soluble unsaturated monomer, the vanadyl sulfate dihydrate was replaced by iron (III) ammonium sulfate dodecahydrate in an amount of 6.69 parts (3000 ppm (as $Fe^{3+}$) of the monomer component), and the amount of the hydrogen peroxide was changed as shown in Table 8. The sample was analyzed in the same way as in Example 73. The results are shown in Table 8.

COMPARATIVE EXAMPLE 46

The same procedure as in Example 73 was repeated to give comparative sample (46) of maleic acid copolymer, except that the amount of the 60% hydrogen peroxide was changed to 19.2 g (equivalent to 5 g per mol of the monomer component). The sample was analyzed in the same way as in Example 73. The results are shown in Table 8.

COMPARATIVE EXAMPLE 47

The same apparatus as in Example 73 was charged with 196 parts of maleic anhydride, 131 parts of monochlorobenzene, and 65.4 parts of xylene, followed by heating to 140° C. To the system was added dropwise over 3 hours a mixture composed of 65.4 parts of di-t-butyl peroxide, 41 parts of xylene, and 65.4 parts of monochlorobenzene and then 26 parts of acrylic acid, followed by aging for 3 hours at the boiling point. The solvents were distilled away, and 197 parts of pure water was added for hydrolysis to give comparative sample (47) of maleic acid copolymer. The sample was analyzed in the same way as in Example 73. The results are shown in Table 8.

COMPARATIVE EXAMPLE 48

A flask equipped with a thermometer, stirrer, dropping funnel, nitrogen inlet, and reflux condenser was charged with 196 parts of maleic anhydride and 300 parts of water (to make 232 parts of maleic acid). The resulting aqueous solution was heated with stirring to 60° C. Subsequently, 138 parts of 30% aqueous solution of sodium hydroxide was added and then 140 parts of isopropanol was added. Further, 26 parts of acrylic acid was added. With the system heated to the refluxing temperature, 0.25 parts of 4.98% (1% as $Fe^{2+}$) aqueous solution of ferrous sulfate ($FeSO_4 \cdot 7H_2O$) was added. Finally, 40 parts of 60% hydrogen peroxide was added dropwise over 6 hours. Heating was continued for another 2 hours, and residual isopropanol was expelled. Thus, there was obtained comparative sample (48) of maleic acid copolymer salt. The sample was analyzed in the same way as in Example 73. The results are shown in Table 8.

COMPARATIVE EXAMPLE 49

The same polymerization vessel as in Example 73 was charged with 77.3 parts of 1-allyloxy-2,3-dihyroxypropane (glycerol monoallyl ether), 116 parts of maleic acid, 166.6 parts of 48% aqueous solution of sodium hydroxide, and 157.4 parts of water. The resulting aqueous solution was heated with stirring to the boiling point of the system. Then, 100 parts of 10% aqueous solution of ammonium persulfate was added dropwise from the dropping funnel over 2 hours, during which the polymerization temperature was kept at the boiling point of the system. The system was left at the same temperature for 30 minutes to complete the polymerization. Thus there was obtained comparative sample (49) of maleic acid copolymer salt. The sample was analyzed in the same way as in Example 73. The results are shown in Table 8.

COMPARATIVE EXAMPLE 50

The same polymerization vessel as in Example 73 was charged with 145 parts of maleic acid, 208.3 parts of 48% aqueous solution of sodium hydroxide, and 156.7 parts of water. With the atmosphere in the vessel replaced with nitrogen, the system was heated to 95° C. with stirring. Then, 35.8 parts of 50% aqueous solution of sodium 3-allyloxy-2-hydroxypropanesulfonate (16.1 parts as 3-allyloxy-2-hydroxypropanesulfonic acid) and 50 parts of 10% aqueous solution of ammonium persulfate were added dropwise from separate dropping nozzles over 4 hours. During dropping, the copolymerization temperature was kept at 95° C. The system was kept at 95° C. for 30 minutes to complete copolymerization. Thus, there was obtained comparative sample (50) of maleic acid copolymer salt. The sample was analyzed in the same way as in Example 73. The results are shown in Table 8.

COMPARATIVE EXAMPLE 51

The same procedure as in Example 73 was repeated to give comparative sample (51) of maleic acid copolymer, except that the amounts of monomer component, hydrogen peroxide, and metal ion were changed as shown in Table 8. The sample was analyzed in the same way as in Example 73. The results are shown in Table 8.

TABLE 8

(Part 1)

| Comparative | Comparative maleic acid copolymer | Other water-soluble | Ratio of (A)/(B) | Degree of neutralization | Metal | Amount of metal ion |
| --- | --- | --- | --- | --- | --- | --- |

TABLE 8-continued

| Example | (salt) | unsaturated monomer (B) | (by weight)[*1] | (%) | ion[*2] | (ppm)[*3] |
|---|---|---|---|---|---|---|
| 31 | (31) | Isoprenol | 90/10 | 50 | $VO^{2+}$ | 20 |
| 32 | (32) | Isoprenol | 90/10 | 0 | — | 0 |
| 33 | (33) | Isoprenol | 90/10 | 0 | $VO^{2+}$ | 3000 |
| 34 | (34) | Isoprenol | 90/10 | 0 | $Zn^{2+}$ | 50 |
| 35 | (35) | Isoprenol | 90/10 | 0 | $Ni^{2+}$ | 50 |
| 36 | (36) | Isoprenol | 90/10 | 0 | $Mn^{2+}$ | 50 |
| 37 | (37) | Isoprenol | 90/10 | 0 | $Co^{2+}$ | 50 |
| 38 | (38) | Isoprenol | 90/10 | 0 | $VO^{2+}$ | 20 |
| 39 | (39) | Isoprenol | 90/10 | 0 | $VO^{2+}$ | 20 |
| 40 | (40) | Isoprenol | 90/10 | 0 | $VO^{2+}$ | 20 |
| 41 | (41) | Isoprenol | 90/10 | 0 | $VO^{2+}$ | 20 |
| 42 | (42) | Acrylic acid | 90/10 | 0 | — | 0 |
| 43 | (43) | Acrylic acid | 90/10 | 50 | $VO^{2+}$ | 20 |
| 44 | (44) | Acrylic acid | 90/10 | 0 | $VO^{2+}$ | 3000 |
| 45 | (45) | Acrylic acid | 90/10 | 0 | $Fe^{2+}$ | 3000 |
| 46 | (46) | Isoprenol | 90/10 | 0 | $VO^{2+}$ | 20 |
| 47 | (47) | Acrylic acid | 90/10 | 0 | — | 0 |
| 48 | (48) | Acrylic acid | 90/10 | 23.7 | $Fe^{2+}$ | 9.7 |
| 49 | (49) | Glycerol monoallyl ether | 60/40 | 100 | — | 0 |
| 50 | (50) | 3-allyloxy-2-hydroxy propanesulfonic acid | 90/10 | 100 | — | 0 |
| 51 | (51) | Isoprenol | 30/70 | 0 | $VO^{2+}$ | 20 |

[*1] (A): maleic acid, (B): other water-soluble unsaturated monomer.
[*2] added all at once at the initial stage.
[*3] ppm (as metal ion) based on the amount of monomer components.

(Part 2)

| Comparative Example | Amount of initiator (g/mol monomer) | Amount of residual monomer (wt %/monomer) | pH at polymerization time (undiluted, at 80° C.) | $M_W$ | $M_N$ | D value ($M_W/M_N$) | Ratio of biodegradation (%) |
|---|---|---|---|---|---|---|---|
| 31 | Hydrogen peroxide (20) | 2 | 4.5 | 5600 | 1900 | 2.95 | 4 |
| 32 | Hydrogen peroxide (20) | 45 | 0.5 | 2800 | 1900 | 1.47 | 5 |
| 33 | Hydrogen peroxide (20) | 10 | 0.3 | 5100 | 1950 | 2.62 | 4 |
| 34 | Hydrogen peroxide (20) | 18 | 0.3 | 2700 | 1900 | 1.42 | 3 |
| 35 | Hydrogen peroxide (20) | 19 | 0.3 | 2750 | 1800 | 1.53 | 4 |
| 36 | Hydrogen peroxide (20) | 17 | 0.3 | 2700 | 1800 | 1.50 | 3 |
| 37 | Hydrogen peroxide (20) | 18 | 0.3 | 2800 | 1800 | 1.56 | 2 |
| 38 | Sodium persulfate (20) | 87 | 1.2 | 3100 | 1800 | 1.72 | 3 |
| 39 | Ammonium persulfate (20) | 85 | 1.1 | 3000 | 1900 | 1.58 | 3 |
| 40 | t-butylhydroperoxide (20) | 70 | 0.5 | 2700 | 1900 | 1.42 | 3 |
| 41 | Cumene hydroperoxide (20) | 73 | 0.5 | 2700 | 1900 | 1.42 | 4 |
| 42 | Hydrogen peroxide (20) | 48 | 0.3 | 2800 | 1800 | 1.56 | 5 |
| 43 | Hydrogen peroxide (20) | 3 | 4.2 | 5900 | 2000 | 2.95 | 4 |
| 44 | Hydrogen peroxide (20) | 10 | 0.3 | 4800 | 1850 | 2.59 | 3 |
| 45 | Hydrogen peroxide (20) | 8 | 0.4 | 5200 | 2000 | 2.60 | 3 |
| 46 | Hydrogen peroxide (5) | 20 | 0.3 | 2900 | 1800 | 1.61 | 2 |
| 47 | di-t-butyl peroxide (27.7) | 20 | — | 4800 | 1800 | 2.67 | 3 |
| 48 | Hydrogen peroxide (10.2) | 25 | 4.0 | 4850 | 1000 | 4.85 | 3 |
| 49 | Ammonium persulfate (6.3) | 12 | 8.5 | 5860 | 1850 | 3.17 | 3 |
| 50 | Ammonium persulfate (3.75) | 6 | 8.5 | 5530 | 1900 | 2.91 | 2 |
| 51 | Hydrogen peroxide (20) | 30 | 0.3 | 2500 | 1700 | 1.47 | 5 |

EXAMPLES 100 TO 126

The performance of samples (73) to (99) of acid-type maleic acid copolymer obtained in Examples 73 to 99 as the antiscale agent was evaluated in the same manner as in Examples 25 to 48. The results are shown in Table 9.

TABLE 9

| Example | Acid-type maleic acid copolymer | Calcium carbonate scale suppressing ratio (%) |
|---|---|---|
| 100 | Acid-type maleic acid copolymer (73) | 87.0 |
| 101 | Acid-type maleic acid copolymer (74) | 81.0 |
| 102 | Acid-type maleic acid copolymer (75) | 83.1 |
| 103 | Acid-type maleic acid copolymer (76) | 86.1 |
| 104 | Acid-type maleic acid copolymer (77) | 84.8 |
| 105 | Acid-type maleic acid copolymer (78) | 83 |
| 106 | Acid-type maleic acid copolymer (79) | 85 |
| 107 | Acid-type maleic acid copolymer (80) | 79.3 |
| 108 | Acid-type maleic acid copolymer (81) | 85.1 |
| 109 | Acid-type maleic acid copolymer (82) | 84.6 |
| 110 | Acid-type maleic acid copolymer (83) | 86.0 |
| 111 | Acid-type maleic acid copolymer (84) | 85.5 |
| 112 | Acid-type maleic acid copolymer (85) | 87.1 |
| 113 | Acid-type maleic acid copolymer (86) | 86.5 |
| 114 | Acid-type maleic acid copolymer (87) | 85.1 |
| 115 | Acid-type maleic acid copolymer (88) | 86.8 |
| 116 | Acid-type maleic acid copolymer (89) | 87.0 |
| 117 | Acid-type maleic acid copolymer (90) | 86.5 |
| 118 | Acid-type maleic acid copolymer (91) | 85.1 |
| 119 | Acid-type maleic acid copolymer (92) | 85.6 |
| 120 | Acid-type maleic acid copolymer (93) | 86.3 |
| 121 | Acid-type maleic acid copolymer (94) | 84.9 |
| 122 | Acid-type maleic acid copolymer (95) | 86.9 |
| 123 | Acid-type maleic acid copolymer (96) | 87.2 |
| 124 | Acid-type maleic acid copolymer (97) | 86.1 |
| 125 | Acid-type maleic acid copolymer (98) | 85.8 |
| 126 | Acid-type maleic acid copolymer (99) | 86.0 |

COMPARATIVE EXAMPLES 52 TO 72

The performance of comparative samples (31) to (51) of maleic acid copolymer (salt) obtained in Comparative Examples 31 to 51 as the antiscale agent was evaluated in the same manner as in Examples 100 to 126. The results are shown in Table 10.

TABLE 10

| Comparative Example | Comparative samples of maleic acid copolymer (salt) | Calcium carbonate scale suppressing ratio (%) |
|---|---|---|
| 52 | Maleic acid copolymer salt (31) | 45 |
| 53 | Maleic acid copolymer (32) | 37 |
| 54 | Maleic acid copolymer (33) | 51 |
| 55 | Maleic acid copolymer (34) | 46 |
| 56 | Maleic acid copolymer (35) | 43 |
| 57 | Maleic acid copolymer (36) | 44 |
| 58 | Maleic acid copolymer (37) | 41 |
| 59 | Maleic acid copolymer (38) | 48 |
| 60 | Maleic acid copolymer (39) | 39 |
| 61 | Maleic acid copolymer (40) | 31 |
| 62 | Maleic acid copolymer (41) | 32 |
| 63 | Maleic acid copolymer (42) | 35 |
| 64 | Maleic acid copolymer salt (43) | 42 |
| 65 | Maleic acid copolymer (44) | 39 |
| 66 | Maleic acid copolymer (45) | 47 |
| 67 | Maleic acid copolymer (46) | 51 |
| 68 | Maleic acid copolymer (47) | 53 |
| 69 | Maleic acid copolymer salt (48) | 58 |
| 70 | Maleic acid copolymer salt (49) | 72 |
| 71 | Maleic acid copolymer salt (50) | 76 |
| 72 | Maleic acid copolymer (51) | 53 |

EXAMPLES 127 TO 153

The performance of samples (73) to (99) of acid-type maleic acid copolymer obtained in Examples 73 to 99 as the detergent builder was evaluated in the same manner as in Examples 49 to 72. The results are shown in Table 11.

TABLE 11

| Example | Acid-type maleic acid copolymer | Chelating ability [mg · CaCO$_3$/g] |
|---|---|---|
| 127 | Acid-type maleic acid copolymer (73) | 245 |
| 128 | Acid-type maleic acid copolymer (74) | 246 |
| 129 | Acid-type maleic acid copolymer (75) | 248 |
| 130 | Acid-type maleic acid copolymer (76) | 252 |
| 131 | Acid-type maleic acid copolymer (77) | 242 |
| 132 | Acid-type maleic acid copolymer (78) | 253 |
| 133 | Acid-type maleic acid copolymer (79) | 244 |
| 134 | Acid-type maleic acid copolymer (80) | 247 |
| 135 | Acid-type maleic acid copolymer (81) | 240 |
| 136 | Acid-type maleic acid copolymer (82) | 241 |
| 137 | Acid-type maleic acid copolymer (83) | 242 |
| 138 | Acid-type maleic acid copolymer (84) | 253 |
| 139 | Acid-type maleic acid copolymer (85) | 249 |
| 140 | Acid-type maleic acid copolymer (86) | 241 |
| 141 | Acid-type maleic acid copolymer (87) | 255 |
| 142 | Acid-type maleic acid copolymer (88) | 246 |
| 143 | Acid-type maleic acid copolymer (89) | 242 |
| 144 | Acid-type maleic acid copolymer (90) | 248 |
| 145 | Acid-type maleic acid copolymer (91) | 245 |
| 146 | Acid-type maleic acid copolymer (92) | 247 |
| 147 | Acid-type maleic acid copolymer (93) | 244 |
| 148 | Acid-type maleic acid copolymer (94) | 241 |
| 149 | Acid-type maleic acid copolymer (95) | 243 |
| 150 | Acid-type maleic acid copolymer (96) | 249 |
| 151 | Acid-type maleic acid copolymer (97) | 246 |
| 152 | Acid-type maleic acid copolymer (98) | 243 |
| 153 | Acid-type maleic acid copolymer (99) | 242 |

COMPARATIVE EXAMPLES 73 TO 93

The performance of comparative samples (31) to (51) of maleic acid copolymer (salt) obtained in Comparative Examples 31 to 51 as the detergent builder was evaluated in the same manner as in Examples 127 to 153. The results are shown in Table 12.

TABLE 12

| Comparative Example | Comparative samples of Maleic acid copolymer (salt) | Chelating ability [mg · CaCO$_3$/g] |
|---|---|---|
| 73 | Maleic acid copolymer salt (31) | 185 |
| 74 | Maleic acid copolymer (32) | 176 |
| 75 | Maleic acid copolymer (33) | 191 |
| 76 | Maleic acid copolymer (34) | 121 |
| 77 | Maleic acid copolymer (35) | 135 |
| 78 | Maleic acid copolymer (36) | 98 |
| 79 | Maleic acid copolymer (37) | 111 |
| 80 | Maleic acid copolymer (38) | 63 |
| 81 | Maleic acid copolymer (39) | 57 |
| 82 | Maleic acid copolymer (40) | 72 |
| 83 | Maleic acid copolymer (41) | 81 |
| 84 | Maleic acid copolymer (42) | 105 |
| 85 | Maleic acid copolymer salt (43) | 175 |
| 86 | Maleic acid copolymer (44) | 154 |
| 87 | Maleic acid copolymer (45) | 163 |
| 88 | Maleic acid copolymer (46) | 152 |
| 89 | Maleic acid copolymer (47) | 135 |
| 90 | Maleic acid copolymer salt (48) | 164 |
| 91 | Maleic acid copolymer salt (49) | 185 |
| 92 | Maleic acid copolymer salt (50) | 190 |
| 93 | Maleic acid copolymer (51) | 121 |

What is claimed is:

1. A process for producing an acid-type maleic acid polymer having a number-average molecular weight of 300–5000 and a D-value (defined below) smaller than 2.0, said process comprising polymerizing a monomer component composed of maleic acid (A) alone or a monomer component composed of 50–99.9 wt % maleic acid (A) and 50–0.1 wt % other water-soluble unsaturated monomer (B), without neutralization, using water as the polymerization solvent, in the presence of at least one metal ion selected from the group consisting of iron ion, vanadium atom-containing ion, and copper ion in an amount of 0.5–500 ppm of said monomer component, by the aid of hydrogen peroxide as the polymerization catalyst in an amount of 8–100 g per mol of said monomer, D-value = $M_W/M_N$ $M_W$ = weight-average molecular weight $M_N$ = number-average molecular weight.

2. A process as claimed in claim 1, wherein the metal ion is at least one selected from the group consisting of $Fe^{3+}$, $Fe^{2+}$, $Cu^+$, $Cu^{2+}$, $V^{2+}$, $V^{3+}$, $VO^{2+}$, and $VO_3^-$.

3. A process as claimed in claim 1, wherein the metal ion is at least one selected from the group consisting of $Fe^{3+}$, $Cu^{2+}$, and $VO^{2+}$.

4. A process as claimed in claim 1, wherein the amount of the metal ion present is 5–100 ppm.

5. A process as claimed in claim 1, wherein the hydrogen peroxide is used in an amount of 10–80 g per mol of the monomer component.

6. A process as claimed in claim 1, wherein the hydrogen peroxide is used in an amount of 15–50 g per mol of the monomer component.

7. A process as claimed in claim 1 wherein the monomer charged contains 30–99% of solids and the polymerization is performed at 50°–160° C.

8. A process as claimed in claim 1, wherein the hydrogen peroxide is charged in such a manner that charging is continued for a certain period of time, charging is suspended temporarily for a while, and charging is resumed and continued for a certain period of time.

9. A process as claimed in claim 1, wherein the water-soluble unsaturated monomer (B) is at least one selected from the group consisting of unsaturated monocarboxylic acid, unsaturated polycarboxylic acid, unsaturated alcohol represented by the formula (1) below, and unsaturated (meth)allyl ether represented by the formula (2) below.

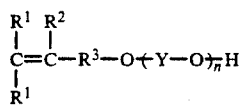
(1)

(where $R^1$ and $R^2$ independently denote hydrogen or a methyl group (but do not denote a methyl group simultaneously); $R^3$ denotes $-CH_2-$, $-(CH_2)_2-$, or $-C(CH_3)_2-$; $R^1$, $R^2$, $R^3$ contain 3 carbon atoms in total; Y denotes an alkylene group having 2-3 carbon atoms; and n is 0 or an integer of 1-100.)

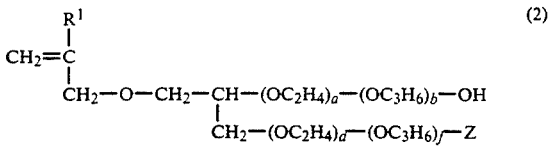
(2)

(where $R^1$ denotes hydrogen or a methyl group; a, b, d, and f denote independently 0 or an integer of 1-100 and a+b+d+f=0-100; the $-OC_2H_4-$ units and the $-OC_3H_4-$ units may be connected in any order; and Z denotes a hydroxyl group, sulfonic group, or phosphoric (or phosphorous) group if the sum of d and f is 0, or a hydroxyl group if the sum of d and f is a positive integer of 1-100.)

10. A water-treating agent which comprises an acid-type maleic acid polymer obtained by any one of claims 1 to 9.

11. A water-treating agent as claimed in claim 10, which is an antiscale agent.

12. A detergent additive which comprises an acid-type maleic acid polymer obtained by any one of claims 1 to 9.

13. A detergent additive as claimed in claim 12, which is a detergent builder.

* * * * *